United States Patent [19]

Bouyoucos et al.

[11] 4,086,122
[45] Apr. 25, 1978

[54] HYDROACOUSTIC WELDER

[75] Inventors: John V. Bouyoucos; Marvin J. Behnfeldt; Roger L. Selsam, all of Rochester, N.Y.

[73] Assignee: Hydroacoustics Inc., Rochester, N.Y.

[21] Appl. No.: 751,828

[22] Filed: Dec. 17, 1976

[51] Int. Cl.$^2$ .................. B06B 1/18; B29C 27/08
[52] U.S. Cl. ................... 156/556; 116/137 A; 156/73.5; 156/580; 228/2
[58] Field of Search .............. 228/1 R, 2; 116/137 A; 156/580.1, 580.2, 73.1, 73.5, 556, 580

[56] References Cited
U.S. PATENT DOCUMENTS

| | | | |
|---|---|---|---|
| 3,033,157 | 5/1962 | Sawyer | 116/137 A |
| 3,212,473 | 10/1965 | Bouyoucos | 116/137 A |
| 3,382,841 | 5/1968 | Bouyoucos | 116/137 A |
| 3,403,374 | 9/1968 | Mellen et al. | 116/137 A |
| 3,469,300 | 9/1969 | Nagin | 228/2 |
| 3,483,073 | 12/1969 | Pounder et al. | 156/73.1 X |
| 3,581,969 | 6/1971 | Bodine | 156/73.1 X |
| 3,612,385 | 10/1971 | Humpage | 156/73.1 X |
| 3,752,380 | 8/1973 | Shoh | 228/1 R |
| 3,905,862 | 9/1975 | Takahashi et al. | 156/580.1 |
| 3,920,504 | 11/1975 | Shoh et al. | 156/73.5 X |

Primary Examiner—William A. Powell
Assistant Examiner—M. G. Wityshyn
Attorney, Agent, or Firm—Martin Lu Kacher

[57] ABSTRACT

Apparatus is described for welding of thermoplastic parts and the like where the heat to melt the surface or surfaces to be joined is produced by friction during high frequency rubbing. The parts are adapted to be placed on a platen which enables the mating surfaces of the parts to be brought into clamping engagement in a welding head. The welding head includes a seismic mass. Stiff flexural members support a plate, against which the parts are clamped with respect to the seismic mass, and which provides for relative vibratory motion of the mating surfaces to be joined. A hydroacoustic driver is coupled to the plate and causes the plate to execute linear vibratory motion at a high frequency, where the stiffness of the flexural members is resonant with the mass of the vibrated portions of the head. Due to the stiffness of the flexural member and the high frequency of vibration, the relative displacement of the mating surfaces to be joined during vibration can be extremely minute. When vibration stops, the restoring force due to the high stiffness of the flexural members brings the parts into alignment without an auxiliary means. The parts fuse together during cooling at the end of the welding cycle. Then the platen is released and the welded parts may be removed from the apparatus.

19 Claims, 5 Drawing Figures

HYDROACOUSTIC WELDER

The invention relates to welding apparatus and particularly to a hydroacoustic welder.

The invention is especially suitable for use in the welding of thermoplastic parts by means of vibration which induces friction heating in the parts so as to cause the parts to fuse at the weld surfaces and bond together as the parts cool. Other parts subject to friction heating induced fusion may also be welded through the use of the invention.

Vibration welding has heretofore been accomplished through the use of mechanical or electromechanical vibrators which move the parts to be welded while they are pressed together into surface contact with one another. These vibrators are limited in vibration frequency and thus require long weld times and high amplitudes of vibration in order to induce sufficient friction heating to obtain fusing of the parts and proper bonding. These welders are also limited to a fixed frequency of vibration. The mass of a platform to be vibrated and the stiffness of springs which support the platform are selected to be nearly resonant at the fixed frequency. Parts to be welded, of necessity must be in a limited range of sizes (viz, mass) in order to maintain the mass spring system tuned to resonance at the fixed frequency. The stiffness of the springs is reduced in an effort to be compatible with the low frequency of vibration and the requisite large vibration amplitudes needed in this instance for friction heating. Such springs may not reliably bring the parts into registry when vibrations cease at the end of a welding cycle. Because of such large vibration amplitudes, vibration welding has been incompatible with certain product designs, such as those which have one part set within another. The overlap or lip clearance of parts in such designs can be less than the vibration amplitude, thus preventing the use of vibration welding. With these vibrators the magnitude of the force which presses the parts to be welded together must be traded off against the limited magnitude of the vibrational forces applied to the parts in order to initiate and sustain the frictional contact during vibration. Thus, both the pressure and vibrational forces are limited. Electromechanical vibrators which have been proposed limit the magnitudes of vibratory forces which can be produced, for example by electric current which can be handled in equipment of practical size.

Reference may be had to U.S. Pat. No. 3,860,468 issued Jan. 14, 1975 and U.S. Pat. No. 3,920,504, issued Nov. 18, 1975 for further information respecting vibration welders of the type which have heretofore been available.

It is an object of this invention to provide improved vibration welding apparatus wherein the foregoing difficulties and disadvantages are substantially eliminated.

It is a further object of the present invention to provide improved hydroacoustic apparatus whereby vibration welding may be accomplished.

It is a still further object of this invention to provide an improved vibration welder wherein high force vibrations may be generated through the use of a hydroacoustic driver.

It is a still further object of the present invention to provide an improved vibration welder wherein high friction forces can be developed through the use of high clamping forces without interfering with the vibrating action in the welder.

It is a still further object of the present invention to provide an improved hydroacoustic welder which produces a high frequency of vibration and enables the use of small amplitude vibration.

It is a still further object of the present invention to provide an improved hydroacoustic welder which enables welding in cases of product designs requiring that parts be set within one another with small clearances therebetween.

Briefly described, vibration welding apparatus embodying the invention makes use of a platen and a welding head which are movable with respect to each other to bring the interface of the parts which are to be welded together into clamped relationship and in registry with each other. The welding head has a seismic mass which may be mounted on a framework such as to be vibration isolated therefrom. A flexural member which presents a high stiffness is attached to the seismic mass and supports a plate for vibratory movement with respect to the mass. This vibratory movement is in the plane of the interface of the parts and is about a position where the parts are in registry with each other. The plate is disposed in engagement with one of the parts when the head and platen bring the parts into clamped relationship. A hydroacoustic driver which translates the flow of pressurized hydraulic fluid into vibratory motion is coupled to the plate. The driver is tunable and can be operated at a frequency which is approximately equal to the resonant frequency determined by the stiffness of the flexural member and the mass thereof as well as the mass of the plate and the parts in engagement therewith. High force vibrations may be obtained; thus permitting large clamping pressures. Vibrations occur at high frequency thus rapidly inducing friction heating of the parts at the interface such that they fuse together. By tuning the driver, the frequency of vibration may be varied in accordance with the mass of the parts and plate which are vibrated; thus enabling the welding of a large range of parts with one welder. The amplitude of the vibration may be small such as to enable the welding of parts which are in nested relationship with respect to each other and have a small clearance therebetween. The stiffness of the flexural member may be high by reason of the high force and high frequency of the vibration produced by the hydroacoustic driver. The parts come rapidly back into registry when vibrations cease and while the high clamping forces are applied. The parts then may cool and solidify to form a welded joint at the interface. At the end of the welding cycle, the platen may be released from the welding head and the welded parts removed from the welder.

The foregoing and other objects, advantages and features of the invention, as well as the presently preferred embodiment thereof, will become more apparent from a reading of the following description in connection with the accompanying drawings in which.

Figure 1:
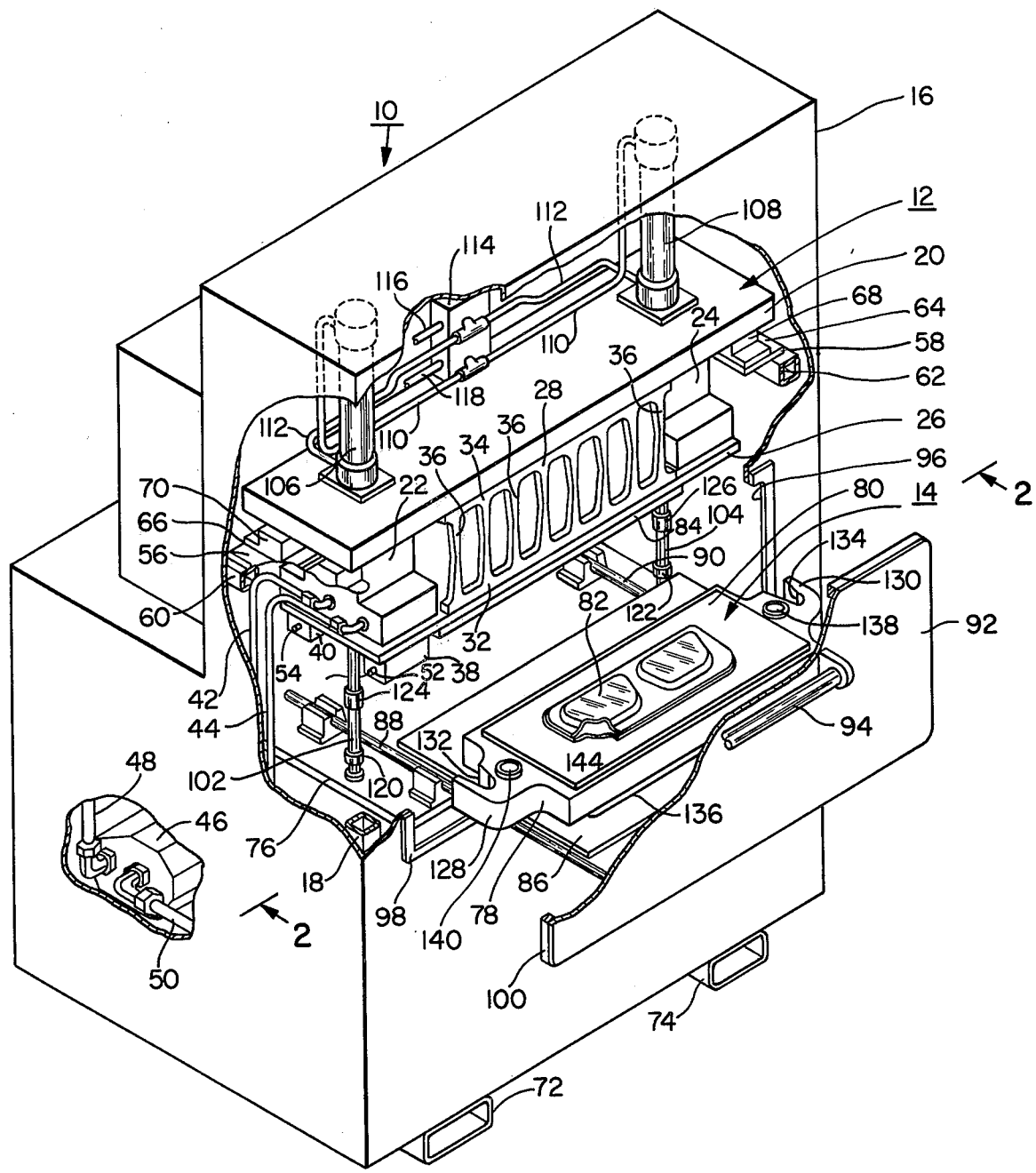
FIG. 1 is a perspective view of a hydroacoustic welder embodying the invention; the view being broken away so as to show the apparatus and the parts to be welded in the position thereof at the beginning and at the end of a welding cycle.

Referring more particularly to the drawings and especially to FIG. 1, there is shown a hydroacoustic welder 10 having a welder head 12 and a platen assembly 14, all mounted in a cabinet 16. A framework 18 of rectangular, tubular struts which may be welded together supports the welding head 12 and the platen assembly 14.

The welding head 12 is provided by a seismic mass made up of a massive plate 20 and blocks 22 and 24 which are attached to the massive plate 20 by bolts, which are not shown in FIG. 1 to simplify the illustration. A vibratory plate 26 is suspended from the massive plate 20 by a pair of flexural members 28 and 30 (see FIG. 3) of high stiffness which act as springs and permit only small amplitude linear vibratory motion of the plate 26 with respect to the massive plate 20. The flexural members 28 and 30 are generally rectangular in shape and have upper and lower sides 32 and 34 extending lengthwise thereof. These sides 32 and 34 are separated by several flexural ribs 36 which extend widthwise of the members 28 and 30. The flexural members support the vibratory plate 26 for compressive loads in the vertical direction, when the platen assembly 14 is brought into clamping engagement with the head 12, as will be described more fully hereinafter. The flexural members 28 and 30 also support the vibratory plate 26 for linear vibratory motion in the horizontal plane of the plate 26. The flexural members 28 and 30 by virtue of their high degree of stiffness for motion in this horizontal plane tend to return to the position where the ribs 36 are vertical. Thus by virtue of the stiffness of the flexural members 28 and 30, the vibratory plate 26 is restored in its initial position when vibratory motion thereof ceases. This has the feature of rapidly registering and aligning the parts before they can cool and solidify at the end of the welding cycle.

The welding head 12 is provided with a pair of hydroacoustic drivers 38 and 40 which are mounted to the block 22. These drivers operate to modulate the flow of hydraulic fluid which is connected to the drivers by way of hydraulic supply and return lines 42 and 44. A hydraulic power supply which consists of a pump 46, suitable reservoirs and accumulators provides the pressurized hydraulic fluid (suitable hydraulic oil) to main supply and return lines 48 and 50 which connect to the lines 42 and 44. While a pair of hydroacoustic drivers 38 and 40 are illustrated in position for driving the vibratory plate 26 near one end thereof, other arrangements of hydroacoustic drivers may be used. For example, a single hydroacoustic driver may be centrally disposed near one end of the plate 26 for driving the plate or additional drivers may be disposed near the opposite end of the plate (viz, supported by the other block 24) for driving the plate near the opposite end thereof. In other words, the plate may be driven by one or more drivers. The number of drivers to be used will depend upon the vibratory forces which are desired for the particular welding application. Accordingly, as many hydroacoustic drivers, disposed at different driving positions, may in accordance with the invention, be used to develop such amplitudes of vibratory force as may be required for various welding applications.

The hydroacoustic drivers may be electrically controlled by signals having frequency corresponding to the frequency of vibration which is desired. Reference may be had to U.S. Pat. No. 3,212,473 for further information respecting the design of such electrically controlled hydroacoustic drivers. The electrical control signals are applied to the drivers at terminals 52 and 54. Alternatively, the hydroacoustic drivers may be self-excited hydroacoustic oscillators or oscillator amplifiers, the design of which may be as set forth in U.S. Pat. Nos. 3,212,473; 3,105,460; 3,461,910 or 3,587,519. Hydroacoustic drivers which are operated by means of an electrical control signal input, as shown, are presently preferred for use in welders embodying this invention. The driver is tunable to vary the frequency of vibration by varying the frequency of the signal.

The welding head 12 is supported on the framework 18 by means of shelves 56 and 58 which are attached to lateral struts 60 and 62 running along the sides of the framework 18. Blocks 68 and 70 of vibration isolating material, such as soft rubber, are sandwiched between the shelves 56 and 58 and the plate 20. Spacers 64 and 66 between the blocks 68 and 70 and the shelves 56 and 58 may be used for height adjustment. The massive plate 20 rests on these slabs 68 and 70. Bolts and pins which are attached to the massive plate 20 may be used to secure it against lateral or vertical movement with respect to the framework 18. Vibration induced in the massive plate is isolated from the framework 18, and thus also from the floor on which the welder 10 rests. The welder may rest on rectangular tubes 72 and 74 which form part of the framework 18.

The framework 18 also supports a stationary platform 76 on which the platen assembly 14 is slidably mounted. The platen assembly itself consists of a platen 78 which holds a fixture 80 in which the parts 82 to be welded are mounted. These parts 82 are illustrated as being two halves of an auto tail light assembly. These parts are of thermoplastic material. It will be appreciated that the welder may be used to weld parts of other shape or several sets of parts. It is merely necessary to change the fixture 80 which holds the part on the platen. The fixture 80 acts as a nest plate into which the operator may place the part. Another part 84 of the fixture may be mounted on the vibratory plate 26 such that the parts 82 are registered or aligned when the platen 78 is brought into clamping engagement with the welding head 12.

The platen 78 rests on a base plate 86 which is attached to slides 88 and 90. These slides are attached to a front panel 92 having a handle 94 which is accessible to the operator from the front of the welder 10, and functions as a drawer. An opening 96 in the front of the cabinet 16 may have a gasket 98 of cushioning material which engages another gasket 100 which is located on the inside of the drawer panel 92. Accordingly, when the drawer is closed the gaskets 98 and 100 are in engagement. All vibratory parts are thus disposed inside the cabinet 16, which is a sealed enclosure, and tends to suppress the emanation of noise which may be produced while the welder is in operation.

Depending from the welder head 12 are a pair of shafts 102 and 104. These shafts 102 and 104 extend from hydraulic cylinders 106 and 108 which are mounted on the top of the massive plate 20. These cylinders have hydraulic lines 110 and 112 attached thereto. The lines connect to a hydraulic valve 114 to which pressurized hydraulic fluid at supply and return pressure is communicated by way of other lines 116 and 118.

This pressure may be controlled for controlling the clamping force. The hydraulic cylinders 106 and 108 may be actuated to raise or lower the shafts 102 and 104.

These shafts have clamp rings 120 and 122 attached near the lower ends thereof. Spaced from the clamp rings 120 and 122 and also attached to the shafts 102 and 104 are release rings 124 and 126. These rings form shoulders on the shafts. The platen has ears 128 and 130. Slots 132 and 134 extend into these ears. These slots are tapered at their open ends so as to be received on the shaft 102 and 104 between the clamp rings 120, 122, and the release rings 124, 126 thereon.

The platen 78 rests upon the base 86. The base 86 has openings therein which receive webs 136 and 146 (see also FIG. 3) which depend from the under side of the platen 78. These webs 136 and 146 serve generally to stiffen the platen. When the drawer is closed the ears 128 and 130 move into engagement with the shaft 102 and 104. The hydraulic cylinders 106 and 108 are actuated to raise the shaft 102 and 104. The clamp rings 120 and 122 then come into engagement at the shoulders thereof with the under sides of the ears 128 and 130. The platen 78 is thus lifted upwardly toward the welding head 12. Sockets 138 and 140 receive alignment pins 142 (see FIG. 2) which rigidly reference the platen 78 for lateral motion with respect to the welding head 12 as the platen is lifted into clamping engagement with the welding head. The force which is applied by way of the hydraulic cylinders 106 and 108 is controlled such that the parts 82 are clamped together between the platen 78 and the vibratory plate 26. The hydroacoustic drivers are then actuated. The plate 26 is then vibrated for a brief period of time until the interface 144 of the parts 82 heat to melt the plastic at this interface. The hydroacoustic drivers 38 and 40 are then deactuated and vibration ceases.

Due to the stiffness of the flexural members 28 and 30 the vibratory plate and the parts 82 clamped thereto are restored to their aligned and registered position. The interface then fuses together to form the weld joint. After the cooling and solidifying period, the hydraulic cylinders 106 and 108 are again actuated and the shafts 102 and 104 are driven downwardly. The release rings 124 and 126 engage at the shoulders thereof the upper side of the ears 128 and 130 and separate the platen. The platen is then returned to its position on the base 86. This time in the cycle another hydraulic cylinder, not shown, may be actuated to push the slides 88 and 90 outwardly, thus breaking open the drawer and indicating the end of the cyle. This sequence may be an automatic cycle which is initiated when the drawer is closed. The operator may then open the drawer 92 and remove the welded parts 82. A new set of parts may then be placed on the platen and the welding cycle repeated.

Inasmuch as the hydroacoustic drivers provide large vibratory forces, high clamping forces (e.g. up to 5800 pounds) may be applied to the interfaces of the parts 82. The frequency of vibration is desirably set through the use of alternating current control signals applied to the drivers 38 and 40 at a frequency to obtain resonant operation. This frequency is the frequency at which the stiffness of the flexural members and the mass of the plate 26, the flexural members 28 and 30, and the parts 82, which are clamped in engagement therewith, are resonant. This frequency may be 250 to 300 Hz. The frequency may be changed to maintain resonance with parts and fixtures of a wide range of sizes and, of course, mass (for example, from 200 to 400 Hz). By virtue of the high forces provided by the hydroacoustic drivers 38 and 40 and the resonant operation of the system and the high clamping forces, amplitudes of vibration may be small (e.g. 1 mm to 1.5 mm peak to peak). Welding cycles may also be short, for example, one second of vibration may typically be used, say for 6 square inches of weld interface.

Figure 2:
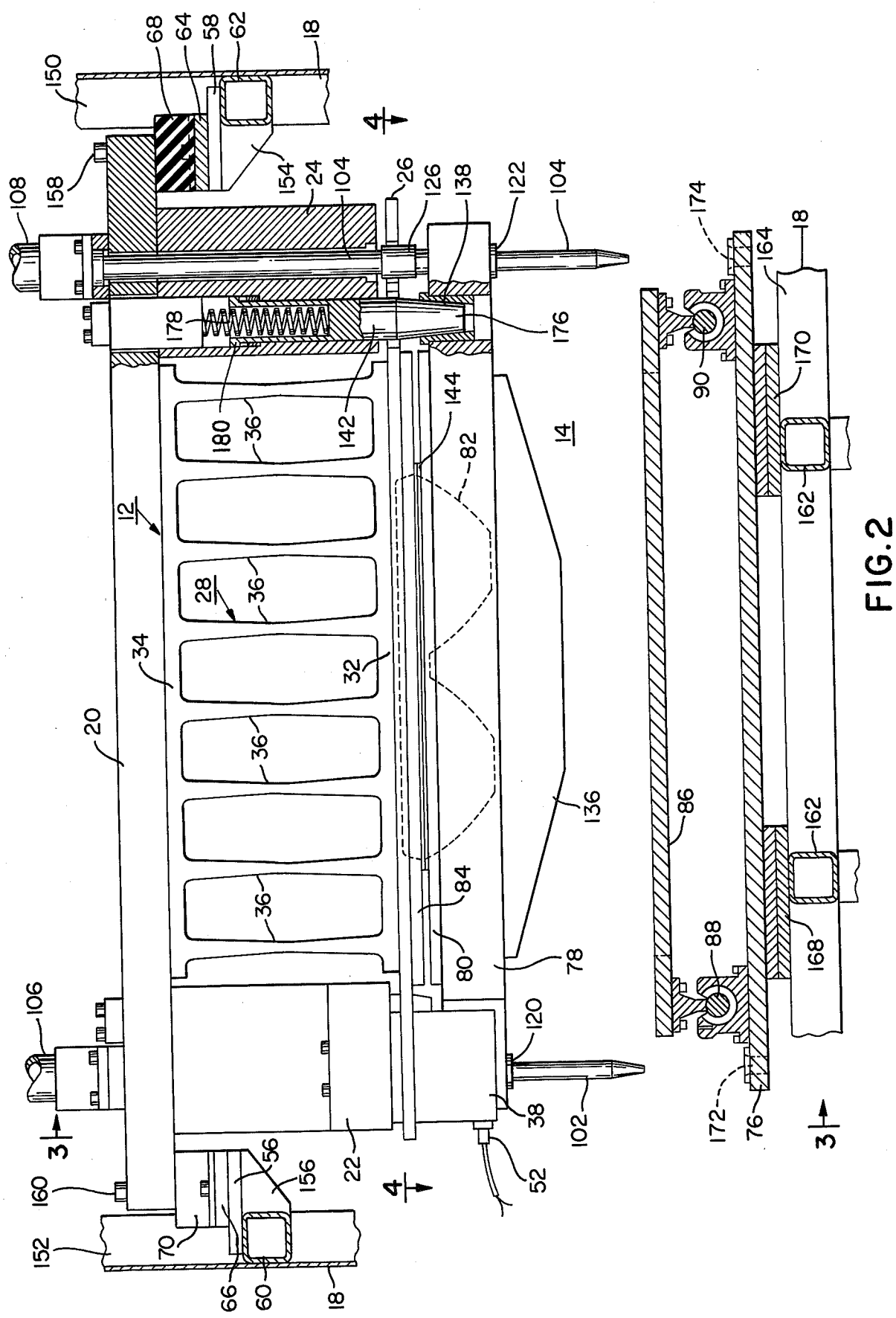
FIG. 2 is a fragmentary elevational view, which is partially in section, of the welder shown in FIG. 1, the section being taken in a plane indicated by the line 2—2 in FIG. 1.
Figure 3:
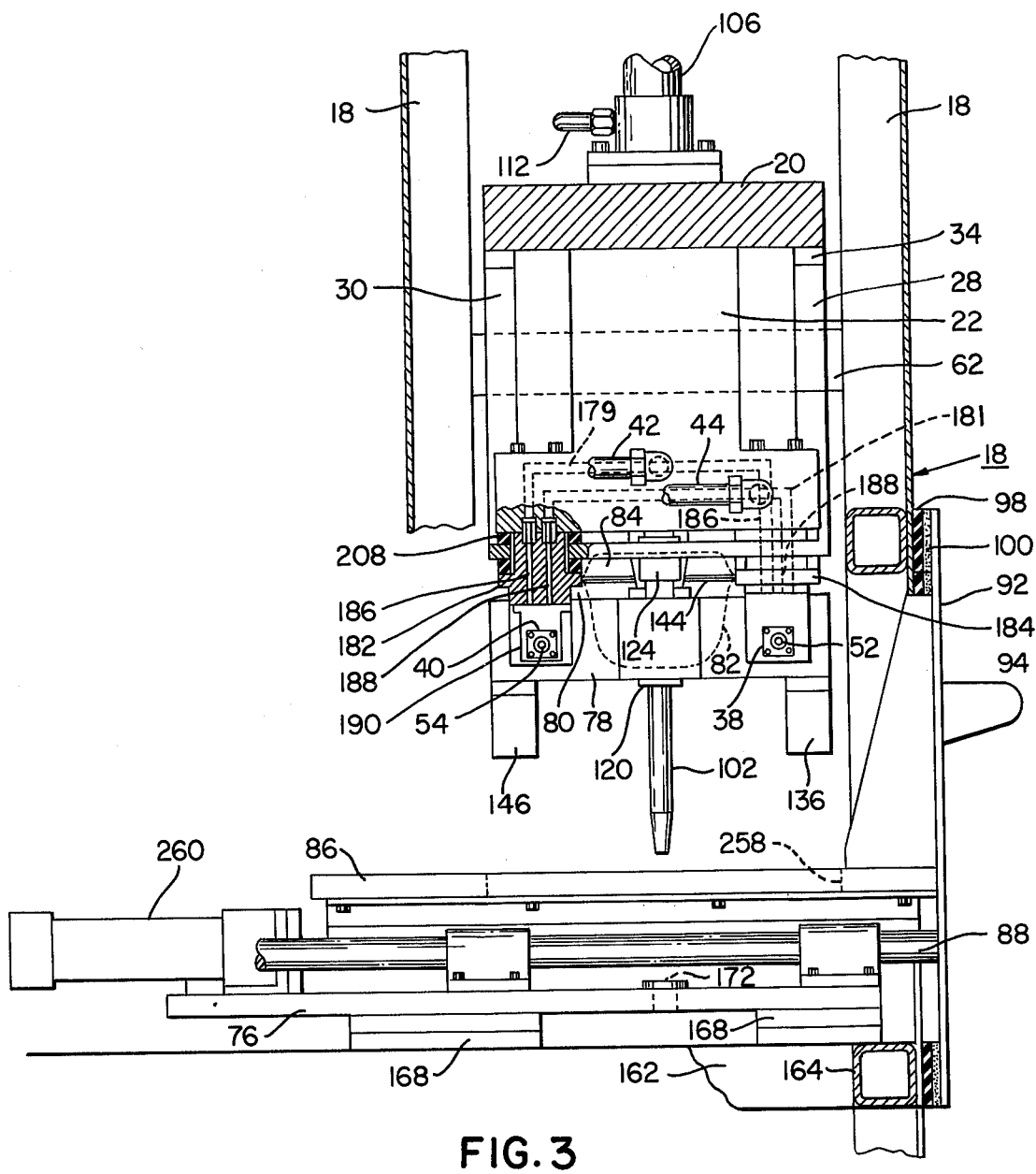
FIG. 3 is a fragmentary end view of the welder shown in FIG. 1, the view being partially in section, the section being taken in a plane indicated by the line 3—3 in FIG. 2.

FIGS. 2 and 3 illustrate the welder with the platens 78 and welding head 12 in clamped relationship. The welding head 12 and the platen assembly 14 are also shown in greater detail than in FIG. 1, in FIGS. 2 and 3. The rectangular tubes which are welded together to form the framework 18 are shown to include the members 60 and 62 which extend side rails 150 and 152. It is on the top of these members 60 and 62 that the shelf plates 56 and 58 are welded. Gussets 154 and 156 which may be welded to the shelf plate and to the members 60 and 62 provide additional bracing for the shelf plates 56 and 58. The ends of the massive plate 20 rests upon the above described arrangement of slabs 68 and 70, spacers 64 and 66 and shelves 56 and 58, to which they may be attached by bolts 158 and 160. The massive plate 20 is supported in vibration isolating relationship by the blocks 68 and 70 of elastic material.

The platform 76, on which the base plate 86 is slidably mounted, is also supported by an arrangement of rectangular tubes 162 which extend between the front and back of the cabinet 16 and by other tubes 164. These tubes 162 and 164 are also part of the framework 18. The platform 76 rests on pairs of plates 168 and 170. The lower plate of each pair may be welded to the tubes 162 and 164. The upper plates are spacer blocks for adjusting the height of the platform. The platform 76 may be secured to the lower plates of the pairs 168 and 170 by means of bolts (not shown) for ease of adjustment.

The platform 76 has holes 172 and 174 which receive the tapered ends of the shafts 102 and 104 when these shafts are in their lowered position, as shown in FIG. 1.

The fragmentary sectional view of the welding head 12 (FIG. 2) also illustrates the operation of the alignment pins 142. These pins 142 are tapered at their lower ends 176. The upper end of the pins 142 are spring loaded downwardly by means of compression springs 178. The displacement of the pins 142 in the downward direction is limited by the flanged upper ends 180 thereof. The tapered lower ends 176 of the pins 142 enter the sockets 138 and 140 in the platen 78 (see FIG. 1). The arrangement of tapered end 176 and tapered sockets 138 and 140 serve to align the platen with the welding head as the platen is raised upwardly into clamping engagement with the welding head by means of the clamp rings 120 and 122 of the hydraulic cylinder shafts 102 and 104, and to provide lateral rigidity for the platen.

In the clamped position as shown in FIGS. 2 and 3, the rims of the parts 82 are clamped together at their interface 144. Inasmuch as the fixture 80 which is attached to the platen 78 and the upper fixture 84, which is attached to the vibratory plate 26, are in alignment with each other, the parts 82 are aligned at their interface. The flexural members 28 and 30 support the vibratory plate 26 in spaced relationship with the lower surfaces of the blocks 22 and 24. Since the ribs 36 of the members 28 and 30 provide flexural support in the lateral directions (along the X axis as taken in FIG. 2) the flexural members 28 and 30 support the controlled clamping forces provided by the cylinders 106 and 108

(viz, along the Y axis) with negligible deflection such that the parts 82 are held securely in contact at their interface 144.

As can be seen in FIGS. 2 and 3, flexural members 28 and 30 by virtue of the thickness and number of their ribs 36 provide a high degree of stiffness for lateral movement in the X direction. The flexural members 28 and 30 define, with the vibratory plate 26, the upper fixture 84 and one of the parts 82 which is movable therewith during vibration, a mass spring system which is resonant at a frequency determined by the stiffness of the flexural members 28 and 30 in the lateral or X direction and the mass of these members 28 and 30 taken with the mass of the vibratory plate 26 and the upper fixture and the upper one of the parts 82 which vibrates therewith. Due to the stiffness of the flexural members 28, this frequency, which is directly proportional to the square root of the stiffness of the members 28 and 30 and inversely proportional to the square root of the mass which is vibratory therewith can be very high, for example 250 to 300 Hz. The frequency will of course vary depending upon the effective mass which vibrates with the plate 26 and varies depending upon the mass of the upper fixture 84 which is used and of the particular upper part. Since the frequency of vibration depends upon the frequency of the signal applied to the hydroacoustic drivers 38 and 40, it can be readily adjusted to accommodate many different parts and fixtures. This high frequency permits the amplitude of vibration to be very small, say 1 to 1½ mm, which in turn enables the welding of parts, such as are in nested relation, which can tolerate only small clearances. The small vibration amplitude allows a much greater variety of joints to be welded. The high clamping forces and rapid vibration enable friction heating of the interface 144 to occur very rapidly, thus resulting in a short welding time and rapid welding cycle, so as to obtain a weld of superior quality.

FIG. 3 illustrates the manner in which the pressurized hydraulic fluid is conducted between the supply and return lines 42 and 44 to the hydroacoustic drivers 38 and 40. In the block 22 there are provided, as by drilling, channels 179 and 181. The hydroacoustic drivers 38 and 40 include housing members 182 and 184 having vertical holes 186 and 188 which serve as hydraulic fluid supply and return channels to an electro-hydraulic valve 190. The supply and return channels 186 and 188 are coupled to the lines 179 and 181 in the block 22.

Figure 4:
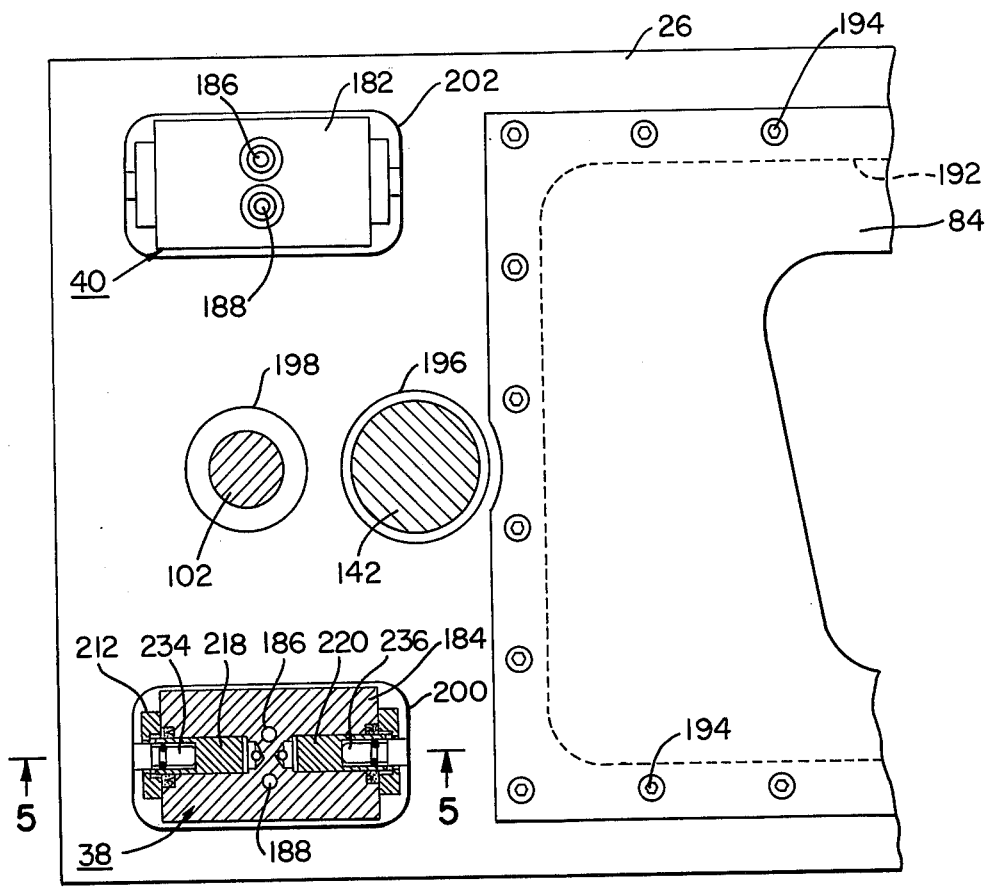
FIG. 4 is a fragmentary sectional view taken along the line 4—4 in FIG. 2.
Figure 5:
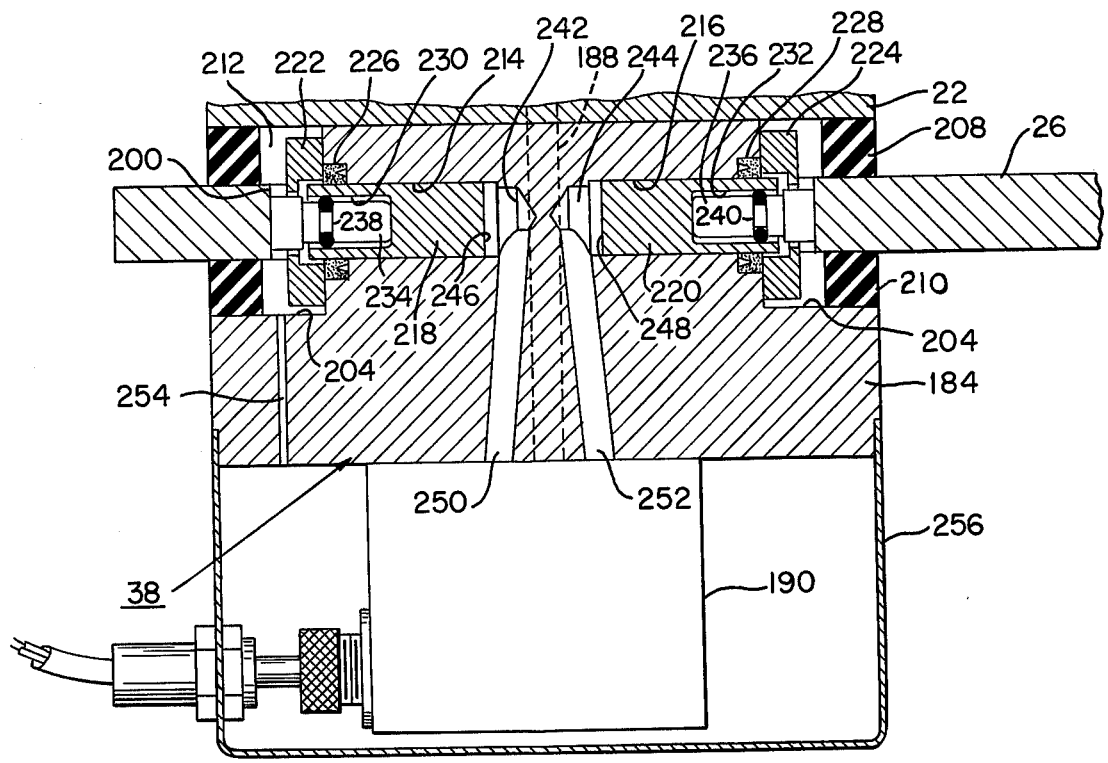
FIG. 5 is a fragmentary sectional view taken along the line 5—5 in FIG. 4.

FIGS. 4 and 5 illustrate the hydroacoustic drivers 38 and 40 in greater detail. The vibratory plate 26, as shown in FIG. 4 is provided with an opening 192 which receives the upper fixture 84 for holding the upper one of the parts to be welded. This upper fixture 84 is attached to the plate 26 by means of screws 194 and covers the opening 84. Each of the alignment pins 142 passes through the plate 26 by way of a clearance hole 196. The shafts 102 and 104 also pass through the plate 26 by way of other clearance holes 198. The housing 182 and 184 of the hydroacoustic drivers 38 and 40 are attached to the block 22 by means of bolts (not shown). Rectangular openings 200 and 202 in the plate 26 provide sufficient clearance for the passage of the upper ends of the housing 182 and 184 therethrough. The upper ends of the housing 182 and 184 are smaller than the lower portions thereof so as to define shoulders 204 which extend around the housings 182 and 184 and are spaced from the lower surface of the block 22 (see FIG. 5).

For the driver 38, which is typical of both drivers 38 and 40, a seal 208 is provided between the shoulder 204 and the lower surface of the plate 26. A similar seal 210 is provided between the lower surface of the block 22 and the plate 26. These seals 208 extend around the housings 182 and 184 and may be cemented to the shoulder 204 and to the lower surface of the block 22. A cavitity 212 is defined between the seals 208 and 210 and the upper portion of the housings 182 and 184 above the shoulders 204 thereof. Blind bores 214 and 216 extend into the upper portion of the housing 184. Drive pistons 218 and 220 are disposed in sliding fit engagement in these bores 214 and 216. Retainer rings 222 and 224 provide stops for the forward ends of the pistons 218 and 220 and also serves to hold "U" cup seals 226 and 228 around the pistons 218 and 220 at the forward ends of the bores 214 and 216.

The pistons 218 and 220 each have blind bores 230 and 232 in the forward end thereof which receive self-aligning drive rods or buttons 234 and 236. These buttons are retained in the bores 230 and 232 by means of "O" rings 238 and 240 which are captured in circumferential slots therein. The forward end of each of these buttons 234 and 236 is disposed in engagement with the edges of the openings 200 which face in the direction of vibratory movement of the plate 26 (viz, in the lateral or X direction). It is along these edges of the opening 200 that drive points are provided whereby the pistons 218 and 220 drive the plate with high driving forces which enable the plate 26 to be vibrated in spite of the large clamping forces which are applied thereto, when the platen 78 is in clamping engagement therewith.

The rear ends of the buttons 234 and 236 are formed as convex surfaces which may be spherical in shape and which bear against the flat surfaces at the blind ends of the bores 230 and 232. Accordingly, when the pistons are biased against the edges of the opening 200, the buttons 234 and 236 align themselves at the drive points along these edges.

Cavities 242 and 244 are defined in the rear ends of the bores 214 and 216 by the rear ends 246 and 248 of the pistons 218 and 220. Transmission lines 250 and 252 provide communication between the electro-hydraulic valve 190 and these cavities 242 and 244 so as to provide pressure variations in the cavity 242 which are 180° out of phase with the pressure variations in the cavity 244. The pressure in these cavities may vary sinusoidally as the flow between the supply and return lines 186 and 188 is modulated by the electrohydraulic valve 190. The hydraulic forces developed and applied to the ends 246 and 248 of the piston 218 and 220 are therefore 180° out of phase and thus drive the edges of the opening 200 which are engaged at the driving points by the buttons 234 and 236, but in 180° out-of-phase relationship (i.e. in push-pull relationship).

The pressure in the cavities 242 and 244 is on average a constant pressure which biases the pistons 218 and 220 and their drive buttons 234 and 236 against the edges of the opening 200 in the plate 20 at the drive points. The electrohydraulic valve 190 is preferably driven by a sinusoidal drive signal such that the pressure variations in the cavities 242 and 244 and the resulting drive forces are sinusoidal.

While a pair of pistons driven in push-pull relationship is presently preferred, hydroacoustics drivers having a single piston drive in push-pull relationship, as shown for example in FIG. 2 of the above-referenced Bouyoucos U.S. Pat. No. 3,212,473, or a single piston in a single drive cavity as shown in FIG. 3 of said patent, may alternatively be used. The electrohydraulic valve may include a control stage and a power stage as, for example, shown in FIG. 8 of the above referenced patent. Other electrohydraulic valves, sometimes called servo valves, may be used in practicing this invention.

Any leakage of pressurized hydraulic fluid along the walls of the bores 214 and 216 which passes the seals 226 and 228 is collected in the cavity 212 and can be removed via a drain line connected to a hole 254. A cover 256 protects the assembly.

As noted above, instead of a pair of hydroacoustic drivers 38 and 40 as shown, each with its individual electrohydraulic valve 190, a single electrohydraulic valve may be used and mounted on or in the block 22. Acoustic transmission lines may then extend from the single valve to the lines 250 and 252 in the housing 184 of the drivers for providing the variations in the pressurized hydraulic fluid in the cavities 242 and 244 of each of the drivers. The housing 182 and 184 then need not be provided with the pressurized fluid supply and return lines 186 and 188 which would of course extend only to the single electrohydraulic valve.

FIG. 3 also shows, attached to the underside of the platen 78, the web 136 and another web 146. These webs serve to reinforce the platen and are received in an opening 258 in the slidable base 86. Accordingly, the webs 136 and 146 drop into the opening 258 when the platen is released by the shafts 102 and 104 of the hydrohydraulic cylinders 106 and 108. Upon such release the platen is then aligned on the base 86 and positioned for the next welding cycle. The operator then need only pull outwardly on the handle 94 and extend the drawer so as to remove the welded part 82 and place a new set of parts on the platen. When the operator closes the drawer, the next welding cycle can automatically be initiated and executed. In order to indicate the end of the welding cycle and to lock the drawer closed during the welding cycle, another hydraulic cylinder 260 is provided (see FIG. 3). This cylinder serves to hold the drawer closed and hold the seals 98 and 100 in tight engagement during the welding cycle. At the end of the welding cycle, the cylinder 260 pushes the slides 88 and 90 forward slightly so as to open the drawer. The operator may then extend the drawer fully through the use of the handle 94 for removal of the welded part and insertion of the parts which are next to be welded.

From the foregoing description it will be apparent that there has been provided an improved welder which is especially adapted to weld thermoplastic parts by means of hydroacoustically generated vibratory forces. While a presently preferred embodiment of the invention has been described above, together with various modifications thereof, other modifications and variations of the disclosed apparatus, within the scope of the invention, will undoubtedly suggest themselves to those skilled in the art. Such modifications can include adaptation of the welding head to a turn-table or conveyor type automatic welding system in which the manually-fed drawer system illustrated herein is replaced by a fully automated part feed system. Accordingly, the foregoing description should be taken merely as illustrative and not in any limiting sense.

What is claimed is:

1. Apparatus for vibratory welding of parts which comprises a platen upon which said parts are adapted to be disposed, a welding head, said platen and said welding head being movable with respect to each other to bring the interface of said parts into clamped relationship, said welding head comprising
   (a) a seismic mass,
   (b) at least one flexural member having substantial stiffness for vibratory motion, attached to said seismic mass,
   (c) a first plate mounted by said flexural members to said mass for said vibratory movement with respect to said mass in the plane of said interface, said plate being disposed in engagement with one of said parts when said head and platen bring said parts into clamped relationship, and
   (d) a hydroacoustic driver, mounted to said mass and having driven members slidably supported solely in said driver which driven members are coupled to said plate, for translating the flow of pressurized hydraulic fluid into high force vibratory motion of said driven member and said plate at a frequency which is approximately equal to the resonant frequency determined by the stiffness of said flexural member and the mass thereof and the mass of said plate and of the part in engagement therewith.

2. The invention as set forth in claim 1 wherein there is provided a framework, and means for mounting said head on said framework and in vibration isolating relationship therewith.

3. The invention as set forth in claim 2 wherein said mounting means comprises a body of vibration isolation material, and means for said framework attaching said seismic mass to said framework through said body.

4. The invention as set forth in claim 3 wherein said attaching means comprises shelves attached to said framework, said shelves being disposed at opposite sides of said seismic mass, slabs of elastomeric material which provide said body, said slabs being supported by said shelves, and said mass bearing upon said slabs and being supported by said shelves.

5. The invention as set forth in claim 1 wherein vibratory motion is linear motion of said plate, said clamping engagement being provided by means for applying clamping forces in a direction perpendicular to the direction of said linear vibratory motion, said hydroacoustic driver producing forces, in said linear vibratory motion direction, of magnitude greater than the frictional forces at said interface due to said clamping forces.

6. The invention as set forth in claim 1 where the frequency of said vibratory motion is in the range from about 200 to 400 Hz.

7. The invention as set forth in claim 6 wherein the peak to peak amplitude of said vibratory motion is in the range of from about 1 to 1.5 mm.

8. The invention as set forth in claim 1 wherein said seismic mass includes a second plate having a mass much greater than said first named plate, said flexural member being first and second planar spring members, each said spring member being attached to said second plate along one of the sides thereof with said attached sides parallel to each other, the opposite sides of each of said spring members being attached to said first plate with the planes of said members in the direction of vibratory motion of said first plate such that said first plate is flexurally supported for linear vibratory motion with respect to said second plate.

9. The invention as set forth in claim 8 wherein said spring members are generally rectangular in shape having sides extending lengthwise thereof and a plurality of flexural ribs extending widthwise thereof to permit lengthwise linear movement of said sides with respect to each other.

10. The invention as set forth in claim 8 wherein clamping means are provided for pushing said platen toward said first plate to bring said parts into clamping engagement, said pushing means being attached to said second plate.

11. The invention as set forth in claim 10 wherein said clamping means comprises a plurality of shafts, said shafts being stepped to provide shoulders, said platen having openings adjacent opposite ends thereof for receiving portions of said shafts spaced in a direction toward said first plate from said shoulders, and means supported on said second plate for applying clamping forces to said shafts in said last named direction whereby to bring said shoulders into engagement with said platen along the rim of the said openings therein whereby to bring said platen and the parts thereon into clamping relationship with said first plate.

12. The invention as set forth in claim 11 including means for supporting said platen for movement toward and away from said shafts, said platen having a pair of ears each having a slot facing in the direction of said shafts and forming a different one of said platen openings such that said platen is received by said shafts when moved toward said shafts.

13. The invention as set forth in claim 11 further comprising a plurality of alignment pins, means mounting said pins on said second plate for movement toward and away from said platen, said mounting means including springs for biasing said pins toward said platen and holes in said platen for receiving said pins as said shafts bring said platen into clamping engagement with said first plate.

14. The invention as set forth in claim 1 wherein said hydroacoustic driver has a piston, disposed for engagement with an edge of said plate at one end of said piston, and means for applying to the opposite end of said piston said pressurized hydraulic fluid having an average pressure for biasing said piston against said edge, which pressure varies cyclically with respect to said average pressure, for applying vibratory forces to said piston which produce said vibratory motion of said plate.

15. The invention as set forth in claim 14 wherein said hydroacoustic driver includes valve means for modulating the flow of said fluid presented to the opposite end of said piston for providing the pressure variations in said fluid.

16. The invention as set forth in claim 15 wherein said piston has a bore in the end thereof adjacent to said edge, a rod disposed in said bore with one end thereof extending outwardly therefrom toward said edge and the other end thereof extending to the inner end of said bore, said other end of said rod having a surface of generally convex spherical shape, and a ring of flexible material around said rod and between said rod and said bore whereby said rod aligns itself in contact with said edge when said position is biased toward said edge to minimize side loading of said piston.

17. The invention as set forth in claim 16 wherein said plate has a hole therein, said edge being a wall of said hole which wall faces in the direction of said vibratory motion.

18. The invention as set forth in claim 17 wherein said hydroacoustic driver has a pair of said pistons which are coaxial with each other, said hole having said wall on one side and a second wall on the opposite side thereof, one of said pair of pistons being disposed in driving relationship with said one wall and the other of said pair of pistons being disposed in driving relationship with said second wall, and said hydroacoustic driver having means for varying the hydraulic pressure presented to said pistons in 180° out of phase relationship whereby said pistons are driven in push-pull relationship.

19. The invention as set forth in claim 14 wherein a plurality of said hydroacoustic drivers is provided, each in driving relationship with said plate along an edge thereof which faces in the direction of said vibratory motion.

* * * * *